United States Patent
Macfarlane

(10) Patent No.: US 9,464,590 B2
(45) Date of Patent: Oct. 11, 2016

(54) VARIABLE STROKE DIRECT INJECTION FUEL PUMP SYSTEM

(71) Applicant: Glen R Macfarlane, Howell, MI (US)

(72) Inventor: Glen R Macfarlane, Howell, MI (US)

(73) Assignee: FCA US LLC, Auburn Hills, MI (US)

( * ) Notice: Subject to any disclaimer, the term of this patent is extended or adjusted under 35 U.S.C. 154(b) by 154 days.

(21) Appl. No.: 14/254,150

(22) Filed: Apr. 16, 2014

(65) Prior Publication Data
US 2015/0300285 A1  Oct. 22, 2015

(51) Int. Cl.
| | |
|---|---|
| *F02D 41/38* | (2006.01) |
| *F02M 63/02* | (2006.01) |
| *F02M 59/10* | (2006.01) |
| *F02M 59/22* | (2006.01) |
| *F02M 59/30* | (2006.01) |
| *F02B 75/12* | (2006.01) |

(52) U.S. Cl.
CPC .......... *F02D 41/38* (2013.01); *F02D 41/3809* (2013.01); *F02D 41/3845* (2013.01); *F02M 59/102* (2013.01); *F02M 59/105* (2013.01); *F02M 59/22* (2013.01); *F02M 59/30* (2013.01); *F02M 63/023* (2013.01); *F02M 63/0265* (2013.01); *F02B 2075/125* (2013.01); *F02D 2041/389* (2013.01); *F02D 2200/021* (2013.01); *F02D 2200/0602* (2013.01); *F02D 2200/0606* (2013.01); *F02D 2200/101* (2013.01); *F02D 2200/602* (2013.01)

(58) Field of Classification Search
CPC ............... F02D 41/38; F02D 41/3818; F02D 41/3845; F02M 59/32
See application file for complete search history.

(56) References Cited

U.S. PATENT DOCUMENTS

| | | | |
|---|---|---|---|
| 2,873,728 A | 2/1959 | Biermann | |
| 7,552,720 B2 | 6/2009 | Borg et al. | |
| 2006/0021599 A1* | 2/2006 | Ciampolini | F02M 59/105 |
| | | | 123/446 |
| 2008/0306669 A1* | 12/2008 | Wang | B60K 31/00 |
| | | | 701/93 |
| 2010/0316506 A1 | 12/2010 | Hamilton | |
| 2012/0177505 A1 | 7/2012 | Gerlach | |

FOREIGN PATENT DOCUMENTS

| | | | |
|---|---|---|---|
| DE | 102012212989 A1 | 1/2014 | |
| EP | 1621763 A1 | 2/2006 | |
| JP | 11159446 A * | 11/1997 | ............... F04B 9/111 |
| SE | 1281142 A * | 7/1972 | ............... F02G 1/047 |
| WO | 2008/077758 A1 | 7/2008 | |

OTHER PUBLICATIONS

International Search Report and Written Opinion dated Jun. 30, 2015 for International Application No. PCT/US2015/025924, International Filing Date Apr. 15, 2015.

* cited by examiner

*Primary Examiner* — Lindsay Low
*Assistant Examiner* — Kevin Lathers
(74) *Attorney, Agent, or Firm* — Ralph E. Smith

(57) ABSTRACT

A variable stroke direct injection (DI) fuel pump system for an engine includes a DI fuel pump having a stroke member and configured to pump a quantity of fuel based on a stroke of the stroke member. The system includes a variable fuel pump actuator assembly comprising an actuator member configured to actuate the stroke member, a control valve configured to control a flow of hydraulic fluid to the actuator member, and a hydraulic fluid pump configured to pump the hydraulic fluid and be actuated by one or more lobes of a camshaft. The system also includes an engine control unit (ECU) configured to control a variable stroke of the stroke member by controlling the control valve based on one or more operating parameters of the engine.

18 Claims, 5 Drawing Sheets

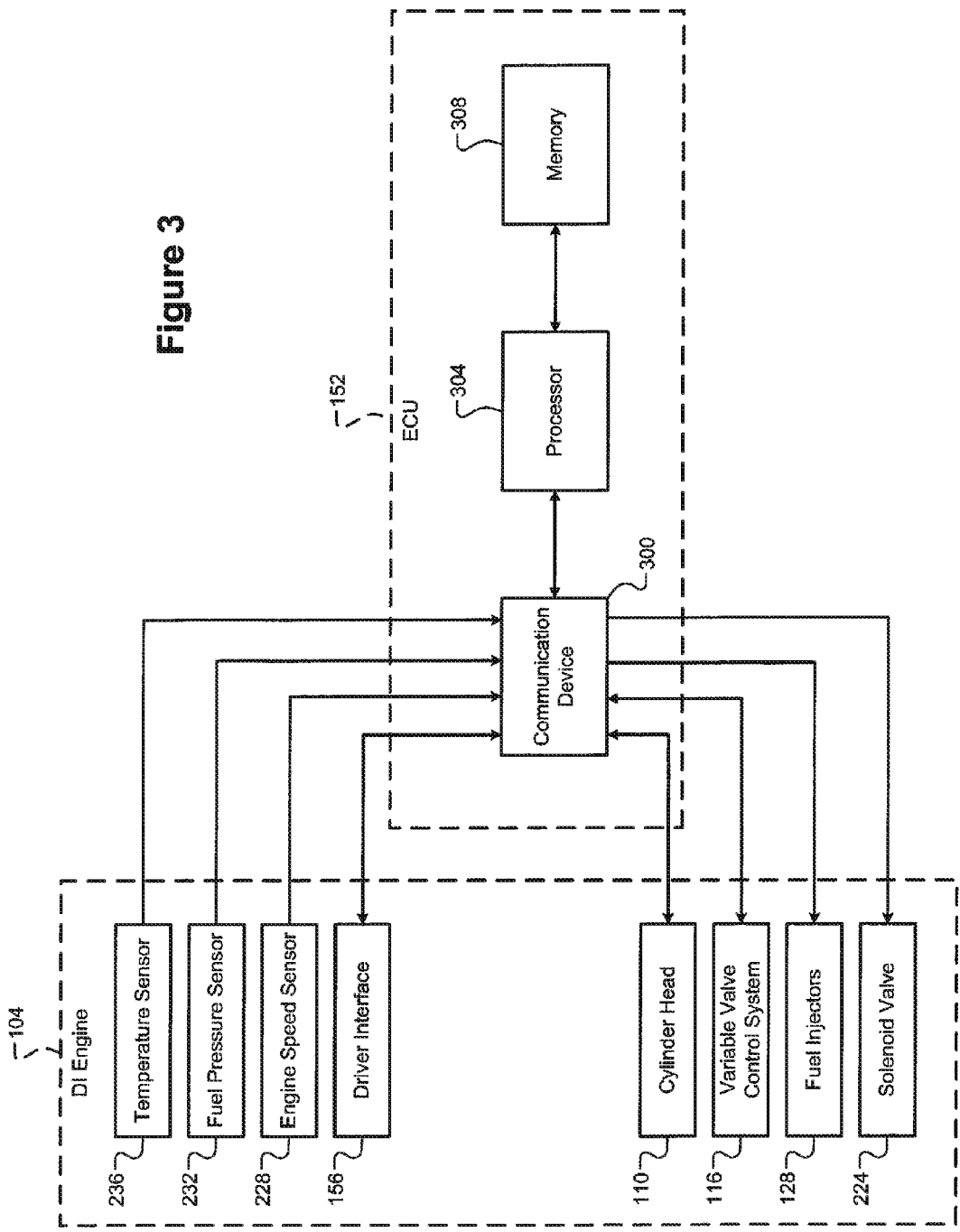

VARIABLE STROKE DIRECT INJECTION FUEL PUMP SYSTEM

FIELD

The present disclosure relates generally to vehicle fuel systems and, more particularly, to variable stroke direct injection (DI) fuel pump systems.

BACKGROUND

Internal combustion engines combust an air/fuel mixture within cylinders to drive pistons that rotatably turn a crankshaft to generate drive torque. Direct injection (DI) engines have fuel systems that inject fuel directly into the cylinders via respective fuel injectors. The fuel is typically highly pressurized in a fuel rail that supplies the fuel to the fuel injectors. A DI fuel pump supplies the fuel to the fuel rail until a fuel pressure in the fuel rail reaches the desired high pressure. The DI fuel pump has a full stroke that corresponds to a maximum amount of fuel able to be supplied by the DI fuel pump. During certain engine operating conditions, however, a full stroke of the DI fuel pump is not necessary, which results in pumping losses if not accounted for. Thus, while such DI fuel systems work for their intended purpose, there remains a need for improvement in the relevant art.

SUMMARY

In one aspect, a variable stroke direct injection fuel pump system is provided in accordance with the teachings of the present disclosure. In one exemplary implementation, the system includes a direct injection (DI) fuel pump having a stroke member and configured to pump a quantity of fuel based on a stroke of the stroke member. The system includes a variable fuel pump actuator assembly associated with a cylinder head of the engine and configured to activate the DI fuel pump. The variable fuel pump actuator assembly includes an actuator member in communication with a control valve and configured to actuate the stroke member in response to a pressure of hydraulic fluid at the actuator member; the control valve configured to control the hydraulic fluid pressure at the actuator member by controlling a flow of hydraulic fluid to the actuator member; and a hydraulic fluid pump configured to pump the hydraulic fluid to the control valve and selectively to the actuator member in response to actuation by one or more lobes of a camshaft. The system also includes an engine control unit (ECU) configured to control a variable stroke of the stroke member by controlling the control valve to deliver a controlled amount of hydraulic fluid pressure to the actuation member based on one or more operating parameters of the DI engine.

In some implementations, the one or more operating parameters include at least one of accelerator pedal position, engine speed, fuel pressure, and temperature. In some implementations, the stroke member is a plunger, and the actuator member is a piston. In some implementations, the hydraulic fluid pump is actuated by a rocker arm that is actuated by the one or more lobes of the camshaft.

In another aspect, a computer-implemented method is provided in accordance with the teachings of the present disclosure. The method includes receiving, at an ECU having one or more processors, one or more operating parameters of a DI engine. The method also includes controlling, by the ECU, a stroke of a stroke member of a DI fuel pump by controlling a control valve of a variable fuel pump actuator assembly associated with a cylinder head of the engine based on the one or more operating parameters. The variable fuel pump actuator assembly includes an actuator member configured to actuate the stroke member, and a hydraulic fluid pump configured to pump hydraulic fluid to the actuator member and be actuated by one or more lobes of a camshaft of the DI engine. The control valve is configured to control a variable stroke of the stroke member by controlling the control valve to deliver a predetermined amount of hydraulic fluid flow to the actuator member.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is an example functional block diagram of an engine control unit (ECU) according to the principles of the present disclosure.

DESCRIPTION

As previously mentioned, conventional direct injection (DI) fuel pump systems for high pressure fuel systems experience increased pumping losses and decreased fuel economy during certain engine operating conditions where, for example, a full stroke of the DI fuel pump is not required. Accordingly, variable stroke DI fuel systems that overcome these and other deficiencies of current systems are presented herein. The variable stroke DI fuel system of the present disclosure is applicable to any DI engine systems having a variable valve control system. The term "variable valve control" as used herein also refers to "variable valve actuation" and "variable valve lift." In accordance with an aspect of the present disclosure, the variable stroke DI fuel system discussed herein is integrated into or with the variable valve control system thereby reducing cost and complexity of components required to provide variable stroke activation of the DI fuel pump.

According to an aspect of the present disclosure, the variable valve control system is configured to actuate intake valves of the DI engine and activate the DI fuel pump. As will be discussed in greater detail below, the variable valve control system is able to adjust a stroke the DI fuel pump in a same or similar manner as a lift of the intake valves are controlled or adjusted. More specifically, higher lift corresponds to a longer/fuller stroke, and lower lift corresponds to a shorter stroke. In this manner, the DI fuel system discussed herein provides for variable stroke activation of the DI fuel pump, which provides for supplying a minimum DI fuel pump stroke required for DI engine operation.

In one exemplary implementation, an engine control unit (ECU) is configured to control the variable valve control system as well as an associated variable fuel pump actuation assembly for the DI fuel pump to selectively command no (zero) stroke through full stroke of the DI fuel pump. In this manner, the ECU is able to fully control the stroke of the DI fuel pump based on engine operating parameters to decrease pumping losses based on or while utilizing the existing variable valve control system. For example, the ECU could command no stroke of the DI fuel pump during low engine load or deceleration fuel cutoff (DFCO) events. Decreased pumping losses results in increased fuel economy, and potentially decreased noise/vibration/harshness (NVH) at low engine loads, e.g., idle.

Figure 1:
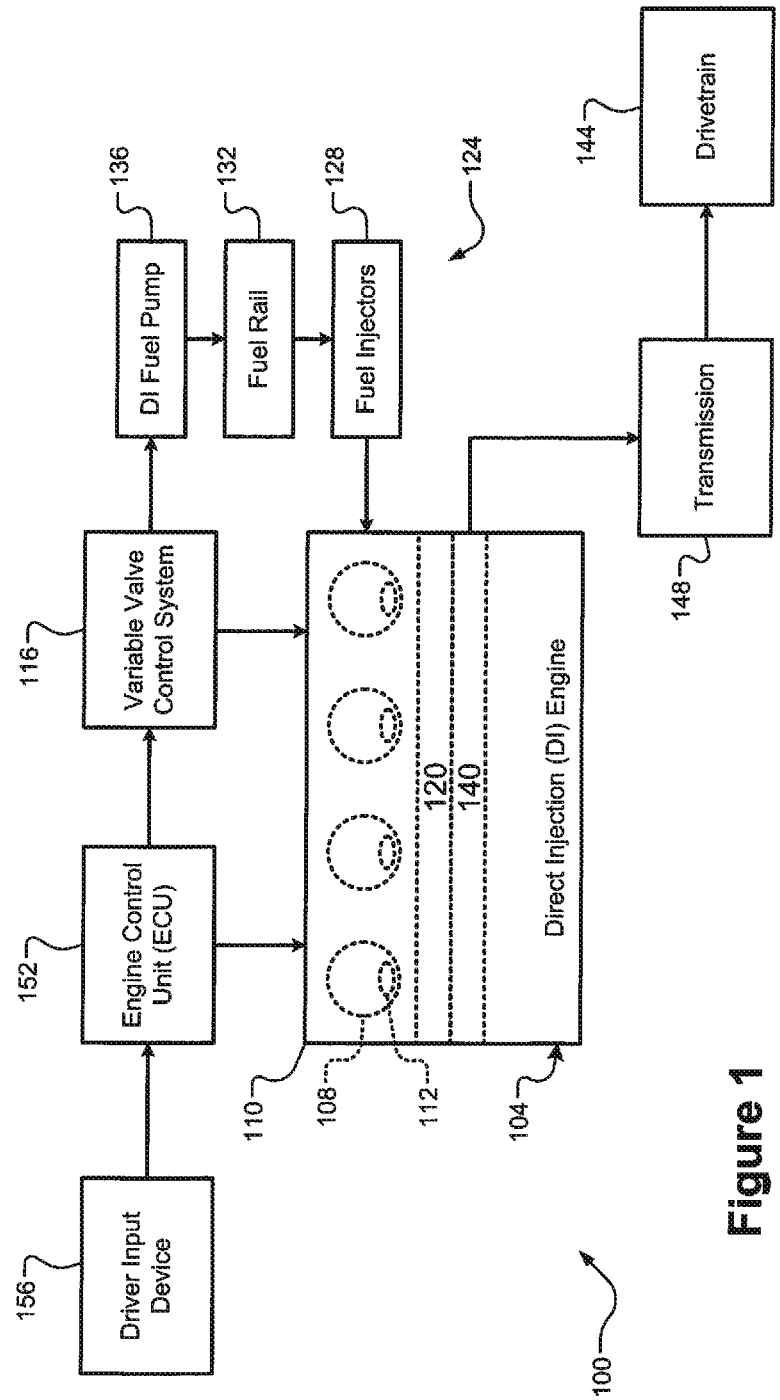
FIG. 1 is an example partial schematic diagram of a direct injection (DI) engine system including a DI engine, a DI fuel system, and a variable valve control system according to the principles of the present disclosure.

Referring now to FIG. 1, an example schematic diagram of a DI engine system 100 is illustrated. The DI engine system 100 includes a DI engine 104 configured to combust an air/fuel mixture within a plurality of cylinders 108 ("cylinders 108") of a cylinder head 110 to generate drive torque. While four cylinders 108 are illustrated, it will be appreciated that the DI engine 104 could include other numbers of cylinders (2, 3, 5, 6, 8, 10, etc.). Specifically, the air is drawn into the DI engine 104 through an air induction system (not shown) and distributed to the cylinders 108 through intake ducts/ports whereby the airflow is controlled by respective intake valves 112. In one exemplary implementation, a variable valve control system 116 is configured to control a lift of the intake valves 112, as will be discussed in greater detail below. A camshaft 120 having a plurality of lobes is configured to selectively actuate the intake valves 112 in connection with the variable valve control system 116, as will also be discussed in greater detail below.

The air in the cylinders 108 is combined with fuel, e.g., gasoline, which is injected directly into the cylinders 108. The fuel is provided by a DI fuel system 124 that includes a plurality of fuel injectors 128 associated with the plurality of cylinders 108, respectively. The DI fuel system 124 also includes a fuel rail 132 that houses or stores fuel for the fuel injectors 128 to inject. Because the fuel injectors 128 share the fuel rail 132, the fuel rail 132 is also referred to as a common fuel rail. The DI fuel system 124 further includes a DI fuel pump 136 that pumps fuel from a fuel tank (not shown) and into the fuel rail 132. The fuel stored in the fuel rail 132 is highly pressurized at a desired pressure, which varies based on the pumping of the DI fuel pump 136 and the injection by the fuel injectors 128.

The DI fuel pump 136 is driven, e.g., mechanically, by the DI engine 104 and, more particularly, the camshaft 120, as opposed to an electronically-driven pump. In the exemplary implementation illustrated, the DI fuel pump 136 is coupled to the cylinder head 110. The air/fuel mixture is compressed by respective pistons (not shown) of the cylinders 108 and ignited, e.g., by spark plugs (not shown). The combustion of the air/fuel mixture drives the pistons, which rotatably turn a crankshaft 140 to generate the drive torque. Exhaust gas resulting from combustion is expelled from the cylinders 108 through respective exhaust valves (not shown) and an exhaust treatment system (not shown). The drive torque is transferred from the crankshaft 140 to a drivetrain 144 (a differential, one or more wheels, etc.) by a transmission 148.

An ECU 152 controls operation of the DI engine system 100. Specifically, the ECU 152 controls the DI engine 104 such that the DI engine 104 generates drive torque corresponding to a torque request received via a driver input device 156, e.g., an accelerator pedal. While not shown, it should be appreciated that the ECU 152 could also be configured to control and/or communicate with the drivetrain 144 and/or the transmission 148. The variable valve control system 116 is also configured to actuate the DI fuel pump 136. In addition, the ECU 152 is configured to control both the DI fuel system 124 and the variable valve control system 116. Thus, the ECU 152 is able to control lift of the variable valve control system 116 to thereby control the stroke of the DI fuel pump 136 (from no/zero stroke to full stroke).

Figure 2A:
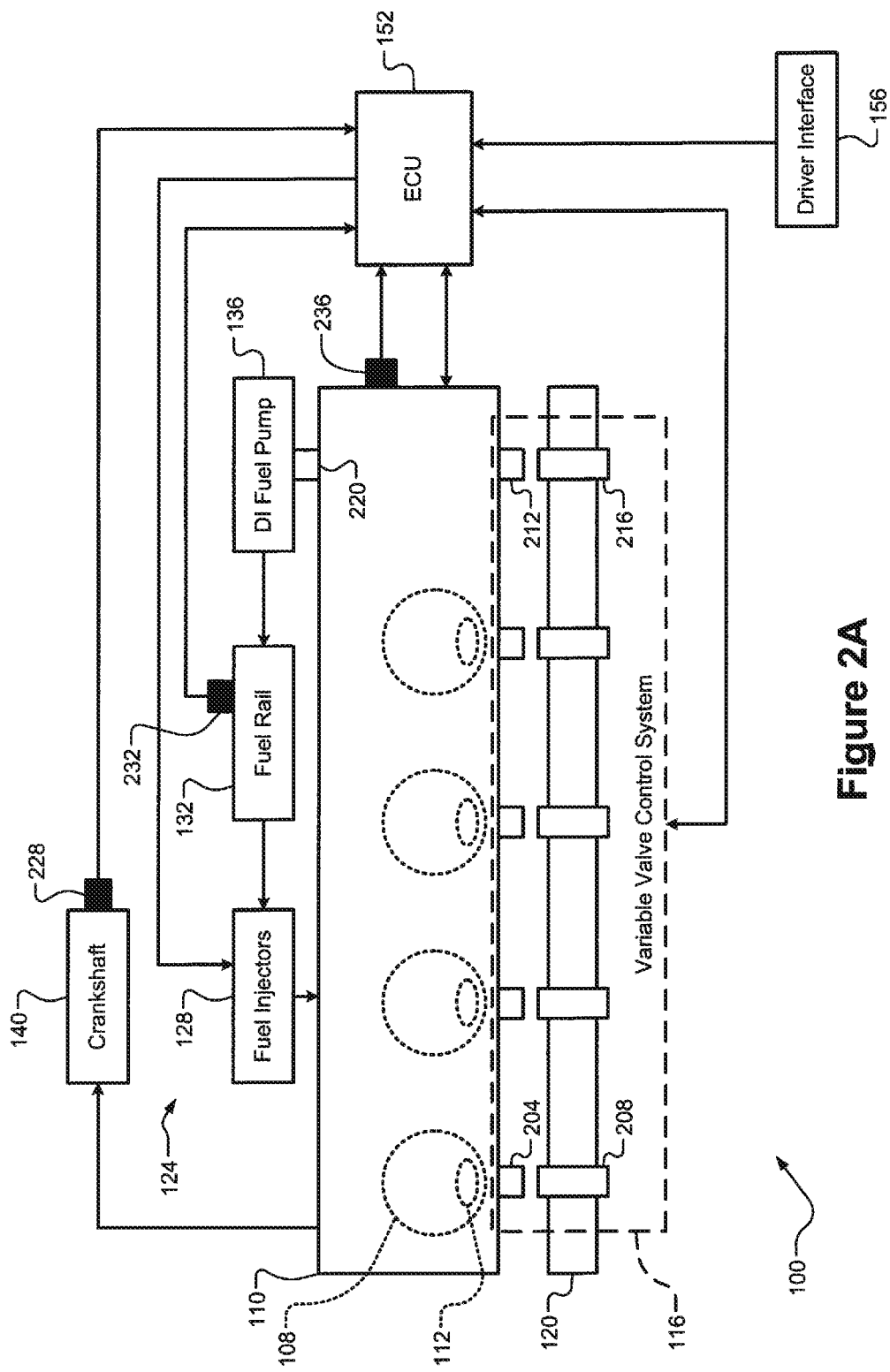
FIG. 2A is an example partial schematic diagram of the DI engine, the variable valve control system, and the DI fuel system according to the principles of the present disclosure.

Referring now to FIG. 2A, an example schematic diagram of the DI engine 104, the variable valve control system 116, and the DI fuel system 124 is illustrated. The variable valve control system 116 includes a plurality of variable valve actuator assemblies 204 ("variable valve actuator assemblies 204") configured to provide variable lift to the corresponding plurality of intake valves 112 of the plurality of cylinders 108, respectively. One example configuration of each variable valve actuator assembly 204 includes an intake roller finger follower/rocker arm, an oil pump, a solenoid valve, and a valve actuator member or assembly. In this example, the variable valve control system 116 is an electro hydraulic system incorporated into the cylinder head 110. As will be discussed in greater detail below, each variable valve actuator assembly 204 is selectively actuated by a respective valve lobe 208 of the camshaft 120 and is controlled by the ECU 152 to provide the desired lift to the corresponding intake valves 112.

The variable valve control system 116 also includes the ability to provide variable stroke activation of the DI fuel pump 136. In one exemplary implementation, the variable valve control system 116 includes a variable fuel pump actuator assembly 212 for providing variable lift or stroke activation to DI fuel pump 136. In the exemplary implementation illustrated, the variable fuel pump actuator assembly 212 is integrated into the cylinder head 110 in a similar manner as the variable valve actuator assemblies 204 and thus does not require moving parts outside of or decoupled from the cylinder head 110. One example of the variable fuel pump actuator assembly 212 also includes the roller finger follower/rocker arm, oil pump, solenoid valve, and actuator member, as will be discussed below in greater detail in connection with FIG. 2B.

The variable pump actuator assembly 212 is actuated by at least one fuel pump lobe 216 of camshaft 120 and selectively controlled by the ECU 152 to provide the desired stroke to a stroke actuator 220 of the DI fuel pump 136. In one exemplary implementation, there are four fuel pump lobes 216 (see FIG. 2B) equally spaced about the camshaft 120, e.g., every 90 degrees or approximately every 90 degrees. In this implementation, a number of the fuel pump lobes 216 are equal to a number of the cylinders 108. In turn, the variable fuel pump actuator assembly 212 is configured to actuate the stroke actuator 220 of the DI fuel pump 136, as will be discussed in greater detail below.

It will be appreciated that while the discussion will continue with particular reference to the operation of the variable fuel pump actuator assembly 212 in connection with the DI fuel pump 136, the components and operation of the variable fuel pump actuator assembly 212 are the same or substantially the same, in accordance with one aspect of the present disclosure, as the components and operation of the variable valve actuator assemblies 204. In other words, in this implementation, the variable valve actuator assemblies 204 include the same or substantially the same components and function in the same or substantially the same manner as the variable fuel pump actuator assembly 212 to provide respective variable lifts to the intake valves 112 and stroke actuator 220.

The stroke actuator 220 is configured to control a stroke of the DI fuel pump 136. One example of the stroke actuator 220 includes a stroke member 278. One example of the stroke member 278 is a plunger, such as in a positive-displacement plunger DI fuel pump 136 having a stationary high-pressure seal through which the plunger slides. It should be appreciated that other stroke actuators could be implemented, such as a piston, e.g., a piston pump. Therefore, depending on the number of fuel pump lobes 216, the DI fuel pump 136 could be actuated a plurality of times during a single revolution of the camshaft 120. Further, the lift of the variable fuel pump actuator assembly 212 could be adjusted, even at a point during a single revolution of the camshaft 120. This flexibility provides for fully-adjustable control of the DI fuel pump 136. In one exemplary implementation, the lift of the variable fuel pump actuator assembly 212 is controlled by the ECU 152 to thereby actively control the stroke of the DI fuel pump 136 (via the stroke actuator 220).

Figure 2B:
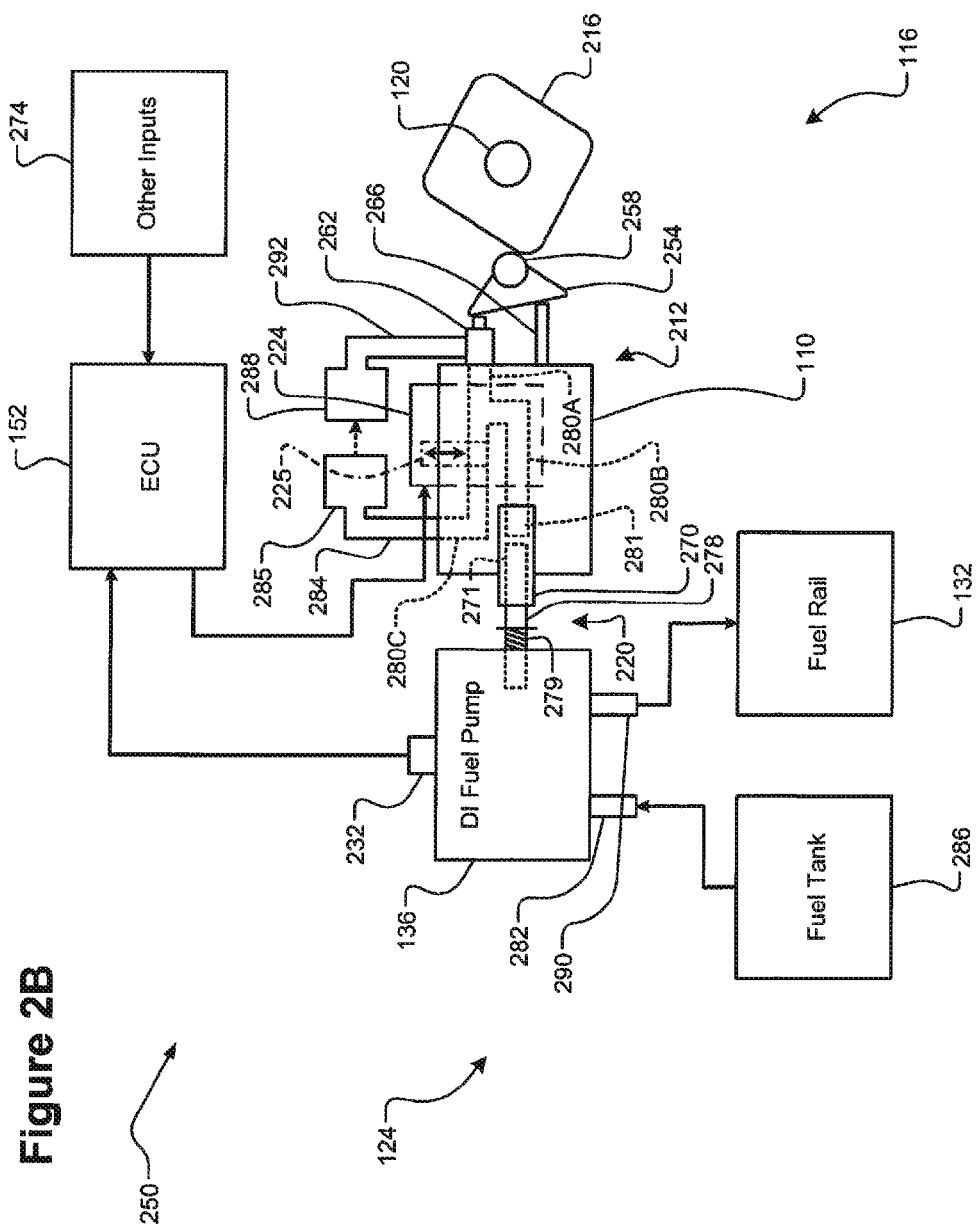
FIG. 2B is an example partial schematic diagram of the variable valve control system and the DI fuel system according to the principles of the present disclosure.

With particular reference to FIG. 2B, an example partial schematic diagram 250 of the variable valve control system 116 and the DI fuel system 124 is illustrated. As previously discussed, one example of the variable fuel pump actuator assembly 212 includes a rocker arm 254, a roller finger follower 258 (collectively "rocker arm/roller finger follower"), an oil pump 262 (or "hydraulic fluid pump 262"), a solenoid valve 224, and an actuator member 270. In this exemplary implementation, the rocker arm 254 is in engagement with the fuel pump lobe(s) 216 via the roller follower 258. As previously discussed, it will be appreciated that while four fuel pump lobes 216 are illustrated, other numbers of lobes could be implemented. For example, for a typical high pressure DI engine, the number of lobes is set so that one pump stroke will occur for each cylinder combustion event.

The rocker arm 254 is operable to actuate the oil pump 262 and is in contact with a fixed pivot 266. The oil pump 262 has a lash adjuster function and is operable to pump oil supplied from an oil circuit 288 to the actuator member 270, which is in engagement with the stroke actuator 220 or stroke member 278. Oil is supplied to the oil pump 262 from the oil circuit 288 via an oil supply line 292. While oil is discussed herein, it will be appreciated that another suitable hydraulic fluid could be utilized. As will be discussed in greater detail below, the solenoid or other controllable valve 224 is configured to selectively control the amount of oil pumped to the actuator member 270 to thereby selectively control the stroke of stroke member 278. The actuator member 270 includes components suitable for actuating the DI fuel pump 136. One example of the actuator member 270 includes a piston and an integrated lash adjuster (not shown). As previously discussed, it will be appreciated that other types of DI fuel pumps could be implemented, such as piston DI fuel pumps.

In the exemplary implementation illustrated in FIG. 2B, the oil pump 262 is coupled to or positioned in the cylinder head 110 and is in fluid communication with the solenoid valve 224 via fluid control passage 280A. Solenoid valve 224 includes an actuator member 225 that is configured to control the flow of oil through passage 280C. When the actuator member 225 is retracted, oil is able to flow through passage 280C and an accumulator line 284 into an accumulator 285. Oil is always able to flow through passage 280B, on the other hand, and into a chamber 281 of the actuator member 270. Oil in chamber 281 causes displacement of the stroke member 278 from a retracted chamber 271 of the actuator member 270, which in turn actuates the DI fuel pump 136. Because of a spring 279 associated with the stroke member 278, however passage 280B is a higher resistance path than passage 280C. Thus, the actuator member 225 of the solenoid valve 224 is operable to control whether or not oil is diverted through the lower resistance path of passage 280C instead of through the higher resistance path of passage 280B.

In the exemplary implementation illustrated, the system is configured such that all of the oil pumped by pump 262 based on a displacement by the rocker arm 254 corresponds to a full plunger stroke of stroke member 278. As discussed above, solenoid valve 224 can be selectively controlled to divert a predetermined amount of the pumped oil from reaching the actuator member 270 and thus vary the stroke of the plunger from a full stroke condition to a zero stroke condition, such as by diverting all or substantially all of the pumped oil. In the exemplary implementation illustrated, the predetermined amount of pump oil that is to be diverted based on the desired stroke of the stroke member 278 can be diverted to passage 280C in communication with solenoid valve 224. The oil diverted to the passage 280C is then provided to the accumulator 285 via the accumulator line 284. In some implementations, oil from the accumulator 285 is able to leakdown to the oil circuit 288 via a leakdown line/system (not shown). In one exemplary configuration, the passages 280A-280C are positioned in the cylinder head 110. In this exemplary implementation, the passages 280A-280C can be formed directly in the cylinder head or in a control assembly member that is coupled to and forms part of the cylinder head 110. In this regard, the cylinder head 110 can be a unitary cylinder head 110 or a cylinder head formed from one or more components that together form cylinder head 110.

Referring now to FIG. 3 with continued reference to FIGS. 1 and 2A-2B, in operation, the ECU 152 receives signals from various sensors indicative of various operating parameters of the DI engine system 100. An engine speed sensor 228 is configured to measure a rotational speed of the crankshaft 140 ("engine speed"), e.g., in revolutions per minute (RPM). A fuel pressure sensor 232 is configured to measure a pressure of the fuel ("fuel pressure") in the fuel rail 132. It should be appreciated that the fuel pressure sensor 232 could alternatively be configured to measure the pressure of the fuel at a different point in the DI fuel system 124, e.g., at the DI fuel pump 136. A temperature sensor 236 is configured to measure a temperature of the DI engine system 100 ("temperature"). In one exemplary implementation, the temperature is a temperature of the DI engine 104 as illustrated (engine coolant temperature, engine operating temperature, etc.). Alternatively, the temperature sensor 236 could be configured to measure another suitable temperature, such as a temperature of the fuel, e.g., in the fuel rail 132.

The ECU 152 receives the engine speed, the fuel pressure, and the temperature from the sensors described above. In addition to, and as previously described, the ECU 152 also receives driver input from the driver input device 156, such as a depression of an accelerator pedal (also known as "accelerator pedal position"). This accelerator pedal position corresponds to a load on the DI engine 104. Based on at least one of these engine operating parameters, the ECU 152 controls the stroke of the DI fuel pump 136 by controlling the variable valve control system 116 and, in particular, the variable fuel pump actuator assembly 212. More specifically, the ECU 152 controls the stroke activation of the variable fuel pump actuator assembly 212, which affects the stroke of the DI fuel pump 136 (via the stroke actuator 220). In one exemplary implementation, the ECU 152 performs feed-forward control of the control valve 224 to provide a predetermined amount of hydraulic fluid flow to the actuator member 270 via fluid passages 280 in the cylinder head 110. In another exemplary implementation, the ECU 152 performs feed-back control of the control valve 224 based on the fuel pressure from fuel pressure sensor 232. Examples of the ECU 152 commanding a longer/fuller stroke of the DI fuel pump 136 (include, but are not limited to, high engine speed, high/large accelerator pedal depression (high engine load), high temperature, and low fuel pressure.

Examples of the ECU 152 commanding a shorter stroke of the DI fuel pump 136 (include, but are not limited to, low engine speed, low/small accelerator pedal depression (low engine load), low temperature, and high fuel pressure. When any of these parameters reach extreme levels, such as idle engine speed, during DFCO events, or at maximum fuel pressure, the ECU 152 is configured to disable the pumping of fuel by DI fuel pump 136 for at least one stroke by providing zero or no stroke activation to the actuator member 270. In some implementations, the ECU 152 could disable the pumping of fuel by the DI fuel pump 136 for a plurality of strokes or for all strokes by diverting substantially all of the oil pumped by oil pump 262 for the desired number of strokes. In this example, substantially all of the oil can include a sufficient amount of the pumped oil being diverted so as to provide no or zero activation of the actuator member 270. For example only, the fuel pump lobe(s) 216 could be a four lobe configuration as previously described, and the ECU 152 could disable the pumping of fuel of DI fuel pump 136 for three of its four strokes (per revolution of the camshaft 120) at idle engine speeds or during DFCO events.

As discussed above, the ECU 152 is configured to control the solenoid valve 224 based on engine operating parameter(s) to control the stroke of the DI fuel pump 136. More specifically, the solenoid valve 224 is operable to control the flow of oil from the oil pump 262 to the actuator assembly 270, thereby selectively disabling or reducing the activation of actuator member 270 and, in turn, selectively disabling or reducing the pumping of fuel by DI fuel pump 136. One example of the one or more engine operating parameters is fuel pressure. As previously mentioned, the fuel pressure sensor 232 could be configured to measure the fuel pressure in the DI fuel pump 136 as illustrated. Examples of other inputs 274 used by the ECU 152 include engine speed, temperature, and driver input, such as accelerator pedal position. When the stroke member 278 is actuated by the actuator assembly 270, the DI fuel pump 136 is able to pump fuel from a fuel tank 286 via a fuel inlet 282 to the fuel rail 132 via a fuel outlet 290.

Referring now specifically to FIG. 3, an example functional block diagram of the ECU 152 is illustrated. The ECU 152 includes a communication device 300, a processor 304, and a memory 308. The communication device 300 is configured for communication between the processor 304 and other components of the DI engine system 100 via a controller area network (not shown). For example, the communication device 300 is configured to receive measurements from the driver input device 156, the engine speed sensor 228, the fuel pressure sensor 232, and the engine temperature sensor 236, and is configured to transmit control signals to the DI engine 104, the variable valve control system 116 (specifically, the variable fuel pump actuator 212), and the solenoid valve 224.

The communication device 300 is also configured to communicate with other components of the DI engine 104, e.g., an electronic throttle control (ETC) unit. The processor 304 is configured to process information received via the communication device 300 and to prepare information for transmission via the communication device 300. In some implementations, the processor 304 performs other functions including, but not limited to, loading and executing an operating system and performing read/write operations at the memory 308. The memory 308 is any suitable storage medium (flash, hard disk, etc.). It should be appreciated that the term "processor" as used herein refers to both a single processor and to two or more processors operating in a parallel or distributed architecture.

Figure 4:
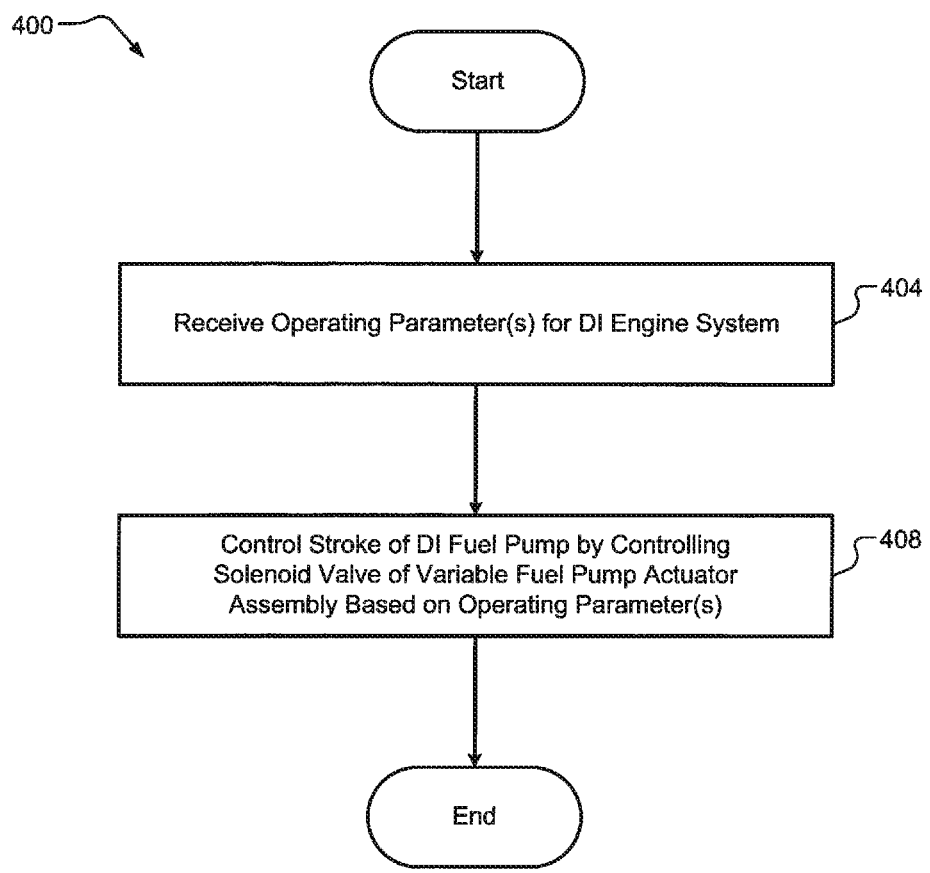
FIG. 4 is an example flow diagram of a computer-implemented method for operating a DI engine system according to the principles of the present disclosure.

Referring now to FIG. 4, a computer-implemented method 400 for operating the DI engine system 100 is illustrated. At 404, the ECU 152 receives one or more operating parameters of the DI engine 104. Examples of the operating parameters include accelerator pedal depression, engine speed, fuel pressure, and temperature. At 408, the ECU 152 controls the stroke of the DI fuel pump 136, e.g., the stroke member 278, by controlling the solenoid valve 224 based on the one or more operating parameters. The computer-implemented method 400 then ends or returns to 404 for one or more additional cycles.

In one exemplary implementation of the computer-implemented method 400, the variable valve control system 116 includes the variable fuel pump actuator assembly 212 having both the no stoke capability as well as variable stroke capability. In this implementation, the variable fuel pump actuator assembly 212 and the fuel pump lobe(s) 216 coupled to the camshaft 120 are operable to selectively actuate the actuator member 270, which in turn is operable to actuate a stroke actuator 220 or stroke member 278 of the DI fuel pump 136.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A variable stroke direct injection fuel pump system for an engine, the system comprising:
   a direct injection (DI) fuel pump including a stroke member and configured to pump a quantity of fuel based on a stroke of the stroke member, wherein the stroke member is a plunger;
   a variable fuel pump actuator assembly associated with a cylinder head of the engine and configured to activate the DI fuel pump, the variable fuel pump actuator assembly comprising:
      an actuator member in fluid communication with a control valve and configured to actuate the stroke member in response to a pressure of hydraulic fluid at the actuator member, wherein the actuator member includes a piston,
      the control valve configured to control the fluid pressure at the actuator member by controlling a flow of hydraulic fluid to the actuator member, and
      a hydraulic fluid pump configured to pump the hydraulic fluid to the control valve and selectively to the actuator member in response to actuation by one or more lobes of a camshaft; and
   an engine control unit (ECU) configured to control a variable stroke of the stroke member by controlling the control valve to deliver a controlled amount of hydraulic fluid pressure to the actuation member based on one or more operating parameters of the engine.

2. The system of claim 1, wherein the actuation member, the control valve and the hydraulic fluid pump are positioned at least partially in the cylinder head.

3. The system of claim 2, further comprising a pump fluid passage in the cylinder head fluidly coupling the hydraulic fluid pump to the control valve and an actuation member passage in the cylinder head fluidly coupling the control valve to the actuation member.

4. The system of claim 1, wherein the variable fuel pump actuator assembly further comprises a rocker arm operatively associated with the camshaft and the hydraulic fluid pump, the rocker arm being configured to be actuated by the one or more lobes of the camshaft to actuate the hydraulic fluid pump.

5. The system of claim 1, wherein the one or more operating parameters include at least one of accelerator pedal position, engine speed, fuel pressure, and temperature.

6. The system of claim 1, wherein the ECU is configured to command a shorter stroke of the stroke member at lower engine loads.

7. The system of claim 1, wherein the ECU is configured to command a longer stroke of the stroke member at higher engine loads.

8. The system of claim 1, wherein the ECU is configured to command no stroke of the stroke member at idle engine speeds or during deceleration fuel cutoff (DFCO).

9. The system of claim 1, wherein the camshaft of the engine is a single overhead camshaft (SOHC).

10. The system of claim 9, wherein the SOHC includes a number of lobes equal to a number of the cylinders of the engine, each lobe being configured to actuate the variable fuel pump actuator assembly.

11. The system of claim 10, wherein the engine further comprises an electro-hydraulic variable intake valve actuation system actuated by the SOHC.

12. A method, comprising:
   receiving, at an engine control unit (ECU) having one or more processors, one or more operating parameters of a direct injection (DI) engine; and
   controlling, by the ECU, a stroke of a stroke member of a DI fuel pump by controlling a control valve of a variable fuel pump actuator assembly associated with a cylinder head of the engine based on the one or more engine operating parameters,
   the variable fuel pump actuator assembly including an actuator member configured to actuate the stroke member, a hydraulic fluid pump configured to pump hydraulic fluid to the actuator member and be actuated by one or more lobes of a camshaft of the DI engine,
   wherein the control valve is configured to control a variable stroke of the stroke member by delivering a predetermined amount of hydraulic fluid flow to the actuator member, wherein the stroke member is a plunger, and wherein the actuator member includes a piston.

13. The method of claim 12, wherein the ECU is configured to perform feed-forward control of the control valve to provide the predetermined amount of hydraulic fluid flow to the actuator member via fluid passages in the cylinder head.

14. The method of claim 12, wherein the one or more operating parameters include at least one of accelerator pedal position, engine speed, fuel pressure, and temperature.

15. The method of claim 14, wherein the ECU is configured to perform feed-back control of the control valve based on the fuel pressure.

16. The method of claim 12, wherein the variable fuel pump actuator assembly further includes a rocker arm configured to actuate the hydraulic fluid pump and to be actuated by the one or more lobes of the camshaft.

17. The method of claim 12, wherein the actuator member is configured to actuate the stroke member in response to a pressure of the hydraulic fluid at the actuator member.

18. The method of claim 12, wherein the camshaft is a single overhead camshaft (SOHC), and wherein the one or more lobes comprise four lobes corresponding to four total cylinders of the DI engine.

* * * * *